United States Patent
Little et al.

(10) Patent No.: US 6,519,074 B2
(45) Date of Patent: Feb. 11, 2003

(54) ELECTROSTATICALLY-ACTUATED TUNABLE OPTICAL COMPONENTS USING ENTROPIC MATERIALS

(75) Inventors: Michael J. Little, Oak Park, CA (US); Ravi J. Verma, Pasadena, CA (US)

(73) Assignee: Parvenu, Inc., Westlake Village, CA (US)

(*) Notice: Subject to any disclaimer, the term of this patent is extended or adjusted under 35 U.S.C. 154(b) by 129 days.

(21) Appl. No.: 09/811,612

(22) Filed: Mar. 20, 2001

(65) Prior Publication Data

US 2001/0055147 A1 Dec. 27, 2001

Related U.S. Application Data

(63) Continuation-in-part of application No. 09/766,687, filed on Jan. 19, 2001.
(60) Provisional application No. 60/211,529, filed on Jun. 15, 2000, and provisional application No. 60/190,110, filed on Mar. 20, 2000.

(51) Int. Cl.[7] .................. G02B 26/00; G02B 25/08; G02B 6/00; H02N 10/00
(52) U.S. Cl. .................. 359/290; 359/291; 359/292; 359/298; 310/306; 385/140
(58) Field of Search .................. 359/290, 291, 359/292, 295, 298, 214, 224, 230; 310/306, 307; 385/140, 73, 24

(56) References Cited

U.S. PATENT DOCUMENTS

| | | | |
|---|---|---|---|
| 4,203,128 A | 5/1980 | Guckel et al. ............... 357/60 |
| 4,400,058 A | 8/1983 | Durand et al. .............. 999/166 |
| 4,553,816 A | 11/1985 | Durand et al. .............. 999/166 |
| 4,825,262 A | 4/1989 | Mallinson ................... 356/352 |
| 4,859,060 A | 8/1989 | Katagiri et al. ............. 356/352 |
| 5,068,861 A | 11/1991 | Abbott et al. ................ 372/26 |
| 5,381,232 A | 1/1995 | Van Wijk .................... 356/352 |
| 5,461,507 A | 10/1995 | Westland et al. ............ 359/289 |
| 5,510,914 A | 4/1996 | Liu et al. ...................... 359/56 |
| 5,561,523 A | 10/1996 | Blomberg et al. ........... 356/352 |
| 5,822,110 A | 10/1998 | Dabbaj ......................... 385/19 |
| 5,862,275 A * | 1/1999 | Takeuchi et al. ............ 310/324 |
| 5,867,302 A * | 2/1999 | Fleming ...................... 310/328 |
| 5,969,848 A * | 10/1999 | Lee et al. .................... 250/310 |
| 5,970,190 A | 10/1999 | Fu et al. ....................... 385/37 |
| 6,078,395 A | 6/2000 | Jourdain et al. ............. 355/352 |
| 6,137,819 A | 10/2000 | Najda ........................... 372/96 |
| 6,229,640 B1 * | 5/2001 | Zhang ......................... 359/223 |
| 6,236,491 B1 * | 5/2001 | Goodwin-Johansson .... 359/230 |
| 6,428,173 B1 * | 8/2002 | Dhuler et al. ............... 359/223 |

FOREIGN PATENT DOCUMENTS

| | | |
|---|---|---|
| EP | 0 702 205 A2 | 8/1995 |
| WO | WO 99/34484 | 7/1999 |

OTHER PUBLICATIONS

Joost C. Lotters et al.; "Polydimethylsiloxane as an elastic material applied in a capacitive accelerometer"; (1996); J. Micromech. Microeng. 6 (1996) pp. 52–54.

(List continued on next page.)

Primary Examiner—Georgia Epps
Assistant Examiner—Jack Dinh
(74) Attorney, Agent, or Firm—Fleshner & Kim, LLP

(57) ABSTRACT

A cost-effective tunable optical component uses entropic, rather than enthalpic, materials to provide a compliant member that supports the optical element and is driven by an electrostatic actuator. Entropic materials exhibit an entropic plateau region over a wide frequency range with a Young's modulus much lower than enthalpic materials, linear elastic behavior over a wide deformation range, and, in certain geometries, energy and stress behavior that tend to stabilize the optical element during deformation. The compliant member can be configured in a variety of geometries including compression, tension, tensile/compressive and shear and of a variety of materials including elastomers, aerogels or other long chained polymers.

19 Claims, 13 Drawing Sheets

OTHER PUBLICATIONS

P. Bley; "Polymers–an Excellent and Increasingly Used Material for Microsystems"; Sep. 1999; SPIE vol. 3876; pp. 172–184.

Thorbjorn Ebeforst et al.; "New small radius joints based on thermal shrinkage of polyimide in V–grooves for robust self-assembly 3D microstructures"; J. Micromech. Microeng. 8 (1998); pp. 188–194.

M. Pedersent et al.; "A capacitive differential pressure sensor with polyimide diaphragm"; J. Micromech. Microeng. 7 (1997); pp. 250–252.

Frank Niklaus et al.; "Low–temperature full wafer adhesive bonding"; J. Micromech. Microeng. 11 (2001); pp. 100–107.

Kenji Suzuki et al.; "Insect–Model Based Microrobot with Elastic Hinges"; Journal of Microelectromechanical Systems, vol. 3, No. 1, Mar. 1994; pp. 4–9.

K. Minami et al.; "Fabrication of Distributed Electrostatic Micro Actuator (DEMA)"; Journal of Microelectromechanical Systems, vol. 2, No. 3, Sep. 1993; pp. 121–127.

Cheol–Hyun Han et al.; "Parylene–Diaphragm Piezoelectric Acoustic Transducers"; The Thirteenth Annual International Conference on Microelectromechanical Systems; (2000), pp. 148–152.

Krzysztof A R B Pietraszewski et al.; "Cryogenic servo–stabilised Fabry–Perot Interferometer for imaging at 2–2.5microns"; SPIE Proceedings, vol. 2814 (1996); pp. 139–146.

T R Hicks et al.; "The application of capacitance micrometry to the control of Fabry–Perot etalons"; J. Phys. E. Instrum., vol. 17, 1984, pp. 49–55.

P. Tayebati et al.; "Widely Tunable Fabry–Perot filter Using Ga(Al)As–AlO$_X$ Deformable Mirrors"; IEEE Photonics Technology Letters, vol. 10, No. 3, Mar. 1998; pp. 394–396.

P. Tayebati et al.; "Microelectromechanical tunable filters with 0.47nm linewidth and 70nm tuning range"; Electronics Letters; Jan. 8, 1998; vol. 34, No. 1; pp. 76–78.

M.C. Larson et al.; "Vertical Coupled–Cavity Microinterferometer on GaAs with Deformable–Membrane Top Mirror"; IEEE Photonics Technology Letters, vol. 7, No. 4, Apr. 1995; pp. 382–384.

K. Aratani et al.; "Process and Design Considerations for Surface Micromachined Beams for a Tunable Interferometry Array in Silicon"; Proc. IEEE Micro Electro Mechanical Systems, Ft. Lauderdal, FL, 1993, pp. 230–235.

MEM–TUNE Tunable Filter; Preliminary Data Sheet; May 2000.

OPM–1 Optical Performance Monitor; Preliminary Data Sheet; May 2000.

GTM–1 EDFA Gain–Tilt Monitor; Preliminary Data Sheet; May 2000.

J.H. Jerman et al.; "Miniature Fabry–Perot Interferometers Micromachined in Silicon for use in Optical Fiber WDM Systems"; Transducers '91, International Solid–State Conference on Sensors and Actuators, pp. 372–375 (1991) IEEE, pp. 472–475.

P. Tayebati "Microelectromechanical tunable filter with stable haft symmetric cavity"; Electronics Letters–IEEE, 1998, p. 1967.

E. Ollier et al.; "Micro–Opto–Electro–Mechanical Systems: Recent developments and LETI's activities"; SPIE; vol. 4075; pp. 12–21.

T. R. Hicks et al.; "The application of capacitance micrometry to the control of Fabry–Perot etalons"; J. Phys. E: Sci. Instrum., vol. 17, 1984; pp. 49–55.

* cited by examiner

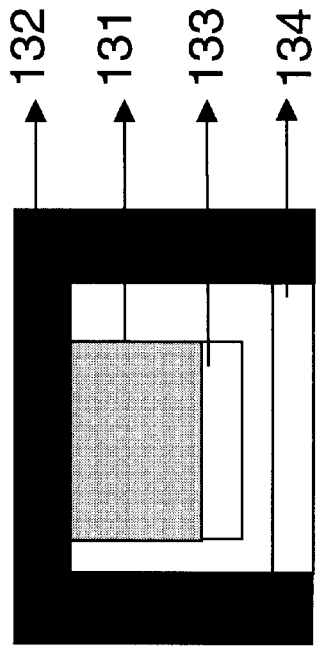
Figure 8(b):Tensile
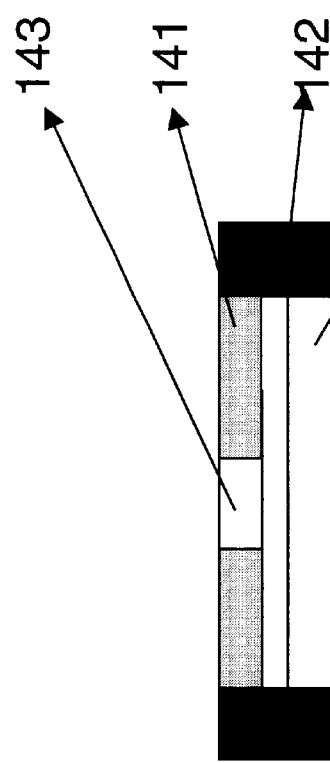
Figure 8(c):Diaphragm
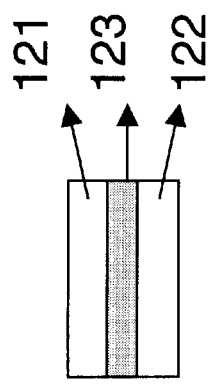
Figure 8(a):Compressive
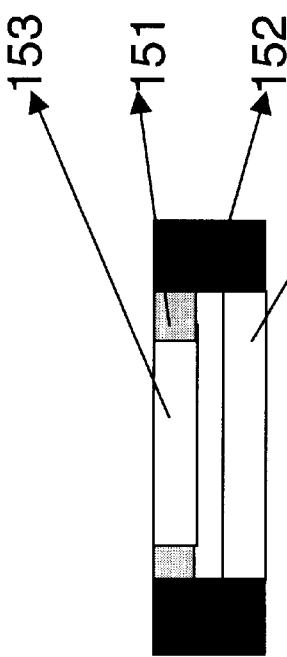
Figure 8(d):Shear

ELECTROSTATICALLY-ACTUATED TUNABLE OPTICAL COMPONENTS USING ENTROPIC MATERIALS

RELATED APPLICATIONS

This application is a continuation-in-part of application Ser. No. 09/766,687, filed Jan. 19, 2001, which claims priority to U.S. Provisional Application Ser. No. 60/190,110, filed Mar. 20, 2000. This application also claims priority to U.S. Provisional Application Ser. No. 60/211,529, filed Jun. 15, 2000. All of the above applications are hereby incorporated by reference in their entirety.

BACKGROUND OF THE INVENTION

1. Field of the Invention

This invention relates to tunable optical components.

2. Description of the Related Art

Industry experts agree that the telecommunications industry is experiencing explosive growth and is one of today's fastest growing economic segments. With the tremendous growth of the Internet and the increase in telecommunications traffic, many telecom companies are rapidly deploying new network topologies and transport technologies such as WDM (wavelength-division-multiplexing) and DWDM (dense-wavelength division multiplexing) to increase the capacities of their networks. With the advent of fiber optic communications networks, the deployment of all-optical networks is clearly the ultimate goal for the next generation of telecommunications networks. Critical to the successful deployment of the all-optical network is the development of cost effective tunable optical components such as tunable filters, tunable laser sources, tunable dispersion compensators (both chromatic and polarization mode) tunable add/drop multiplexers, etc.

MEMS devices are a promising new class of tunable optical components. These devices generally comprise an array of small (ca. micron sized) moving parts, which are manipulated into desired configurations, to actuate an optical member. For instance, an array of micromirrors can be manipulated to create an optical cross connect switch, a pair of parallel mirrors can be manipulated to create a tunable Fabry-Perot Interferometer, etc.

Currently, the vast majority of MEMS devices are constructed with silicon, metallic or glassy hinges, which anchor a moving, part (e.g. a micromirror) to a substrate, which typically contains a control electrode. When a command signal in the form of a voltage is applied between the electrode and the moving part, the moving part moves against the restoring force exerted by the hinge. Use of these silicon/glassy/metallic materials for hinges creates engineering hurdles, which severely limits the design space of the MEMS device. Generally, these limitations are accepted, or circumvented with a series of electrodes together with a feedback control loop that maintains tight control over the position of the moving parts. These limitations include the inherent stiffness of such materials, the limited linear elastic range of such materials and the complexity, hence expense of the precision lithography associated with machining such materials.

Thus, traditional silicon micromachining techniques have not provided a cost effective solution for tunable optical components for use DWDM networks.

SUMMARY OF THE INVENTION

In view of the above limitations, the present invention provides a cost-effective approach for tunable optical components with an enhanced range of motion.

This is accomplished with an optical element that is supported by a compliant member. Tunability is afforded by creating an electrostatic force that deforms the compliant member. When the force is removed, the energy stored in the compliant member restores the optical element to its initial position.

In accordance with the present invention, the compliant member is formed of an entropic, rather than an enthalpic material, with a variety of geometries including compression, tension, shear and combinations thereof. Entropic materials afford four key advantages over enthalpic materials (e.g. silicon, metals, glasses), pertaining to device response and positional/angular stability.

(1) Entropic materials (e.g. long chain homopolymers, block copolymers, elastomers, aerogels etc.) exhibit an entropic plateau region (characterized by an elastic modulus that is ca. 5 MPa or less, and is independent of frequency and strain level over a wide range of frequencies and strain levels. Enthalpic materials have an elastic modulus that is ca. 1 GPa or more, and is independent of frequency only for very small strain levels. Hence, entropic materials are far more compliant.

(2) Entropic materials have a much higher elastic limit (more than ca. 100% strain vs. less than ca. 1% strain for enthalpic materials) and thus avoid plastic deformation during actuation. This greatly enhances the achievable tuning range.

(3) Entropic materials are incompressible--the energy cost for volume deformation is nearly infinite, when compared to the energy cost for linear and shear deformation. This compares with enthalpic materials wherein the energy cost for volume and linear deformations are comparable. This large difference in the energy cost of deformation possessed by entropic materials can be exploited to great advantage in the design of tunable optical components. For example, when the angular misalignment of a movable optical component requires volume deformation in the compliant member, while tuning requires a shear or linear deformation only, then the energy cost for angular misalignment can become much higher than the energy cost for tuning with an entropic compliant member material, thus the device can be intrinsically more resistant to misalignment during tuning that an equivalent design that uses enthalpic materials.

(4) Entropic materials have a normal stress behavior: when they are shear deformed, they exert a so called normal stress perpendicular to the direction of shearing, in addition to the shear stress directly resulting from the shear strain. This behavior can be used to further enhance stability with specific compliant member geometries. On the other hand, enthalpic materials display a negligible normal stress behavior, and thus the normal stress behavior cannot be exploited for enhanced stabilities with enthalpic restoring layer materials.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 8a through 8d illustrate different compliant member geometries including compressive, tension, diaphragm and shear;

DETAILED DESCRIPTION OF THE INVENTION

The present invention provides a cost-effective solution for tunable optical components with an enhanced range of motion.

To achieve a wide tuning range, the compliant member must display linear-elastic behavior over a wide range of frequencies and over the entire deformation range at low actuation forces. The entropic material provides such behavior.

To achieve a repeatable and precise actuation, the compliant member must display positional and angular stability to within a tight tolerance. The entropic material provides a very steep energy profile that enhances stability for a given device compliance. In other words, for an entropic restoring layer with the proper device geometry member configuration, the energy cost of misalignment becomes significant compared to the energy cost of deformation. On the other hand, for enthalpic materials, the energy cost for misalignment remains comparable to the energy cost for tuning irrespective of the device geometry: hence conventional devices are less stable than the present invention. Entropic materials also provide a normal stress component, which can further enhance stability in certain member geometries.

To be cost effective, any solution must avoid expensive materials, and high precision manufacturing operations such as precision lithography with its high capital investment, provide high yields, limit the complexity of any external control circuitry and minimize recalibration requirements (manual or automatic). Because entropic materials exhibit much lower Young's modulus than enthalpic materials, the compliant member can be much thicker and generally less precise than enthalpic materials of equivalent stiffness without sacrificing performance. There is a significant cost advantage provided by spin coating and curing entropic materials versus the expensive vacuum based deposition technologies used in standard MEMS processes for enthalpic materials. Furthermore, the larger linear range and enhanced stability of entropic materials vis-à-vis enthalpic materials reduces the need for external control and frequent recalibration.

Entropic vs. Enthalpic Materials

Linear-Elastic Behavior

Figure 1A:
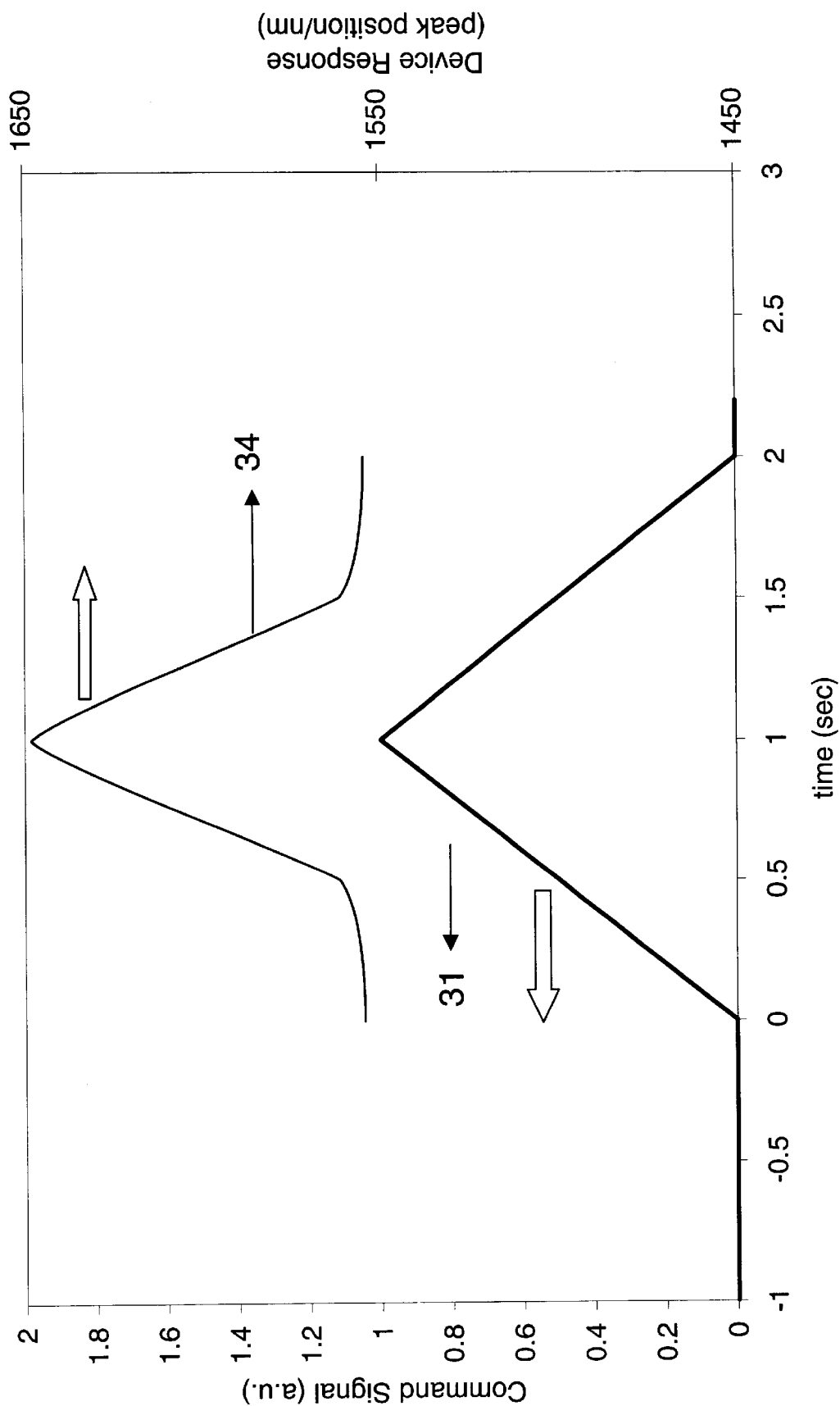
FIGS. 1a–1c are respectively, command signal, power spectrum and Young's modulus plots that together illustrate the required linear elastic properties for tunable optical components.
Figure 1B:
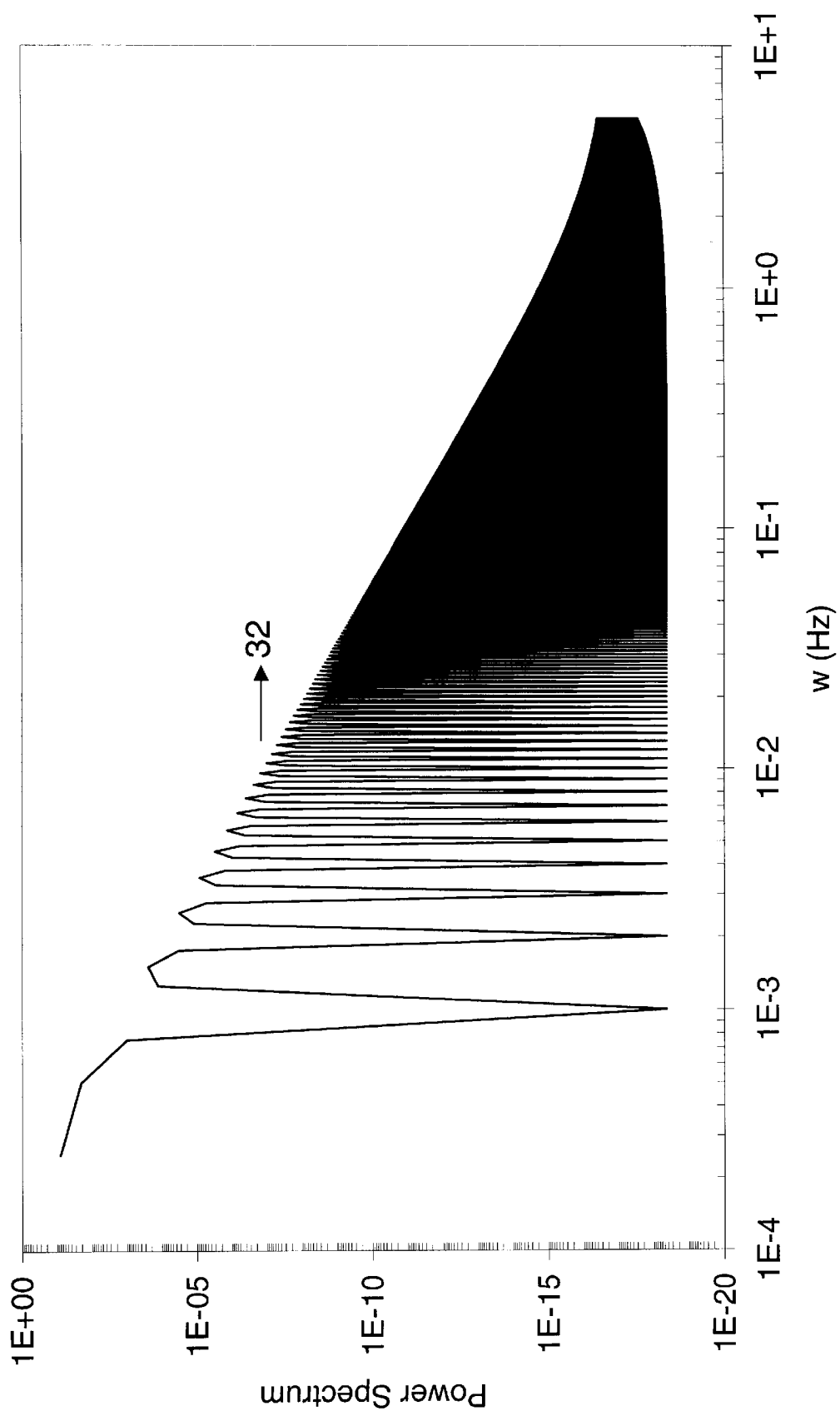
Figure 1C:
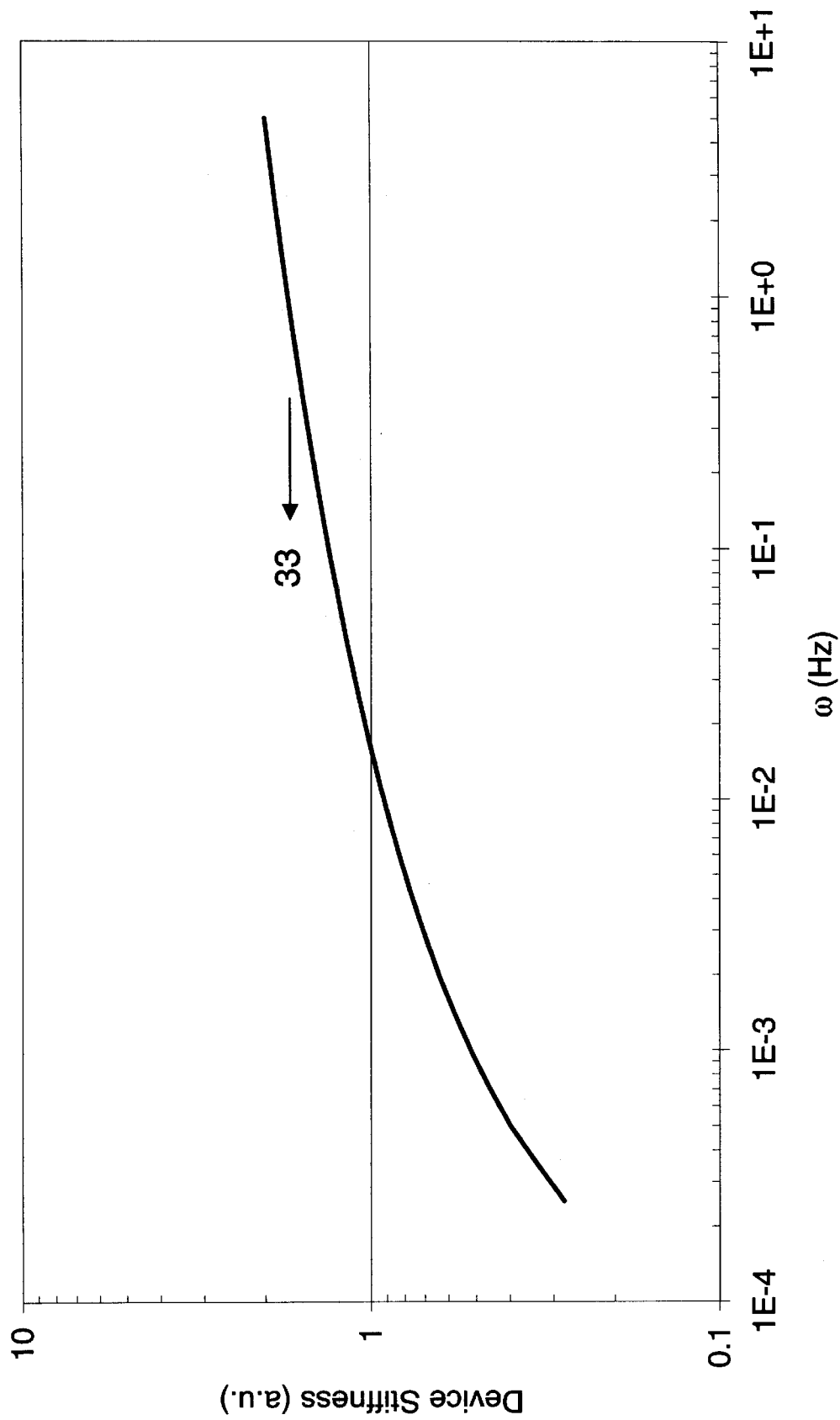

As discussed, the compliant member must display linear-elastic behavior over a wide range of frequencies, and over the entire deformation range. Failure to maintain a linear response can cause numerous problems including varying response to drive signals, positional and angular instability, the need to include expensive electronic control and frequent recalibration. As depicted in FIGS. 1a–1c, a triangular command signal (31) has a power spectrum that is significant in magnitude over several decades in frequency (32). Neglecting viscous effects, the device is characterized by its stiffness. If the device stiffness (E) (33) changes with frequency, then the shape of the device response (34) significantly differs from the shape of the command signal. This relatively simple illustration (which ignores viscous effects) outlines the requirement for an elastic compliant material that is absent of any viscous effects. In other words, any change in the material's Young's modulus (either with deformation frequency/time scale, or with deformation strain level) will produce a non-linear response (here, non-linearity refers to a discrepancy between the shape of the device response and the command signal).

The Young's modulus can be associated with the energy cost of deforming the compliant member. If the response is complex and time dependent, then the modulus is best described as either being time dependent $G_t$, or being frequency dependent, and comprising an elastic part ($G'_\omega$) and a viscous part ($G''_\omega$). The overall modulus originates from several modes, $$G_t = \sum_i g_i \cdot e^{\left(-\frac{t}{\tau_i}\right)} \qquad \text{eqn. 1a}$$

$$G'_\omega = \sum_i g_i \cdot \frac{(\omega\tau_i)^2}{1+(\omega\tau_i)^2} \qquad \text{eqn. 1b}$$

$$G''_\omega = \sum_i g_i \cdot \frac{(\omega\tau_i)}{1+(\omega\tau_i)^2}$$

In Equation 1, $g_i$ is the initial modulus contribution of the $i^{th}$ mode, and $\tau_i$ is the corresponding relaxation time. From a molecular viewpoint, examples of a mode include bond stretching, rotation, vibration, and bending.

Figure 2:
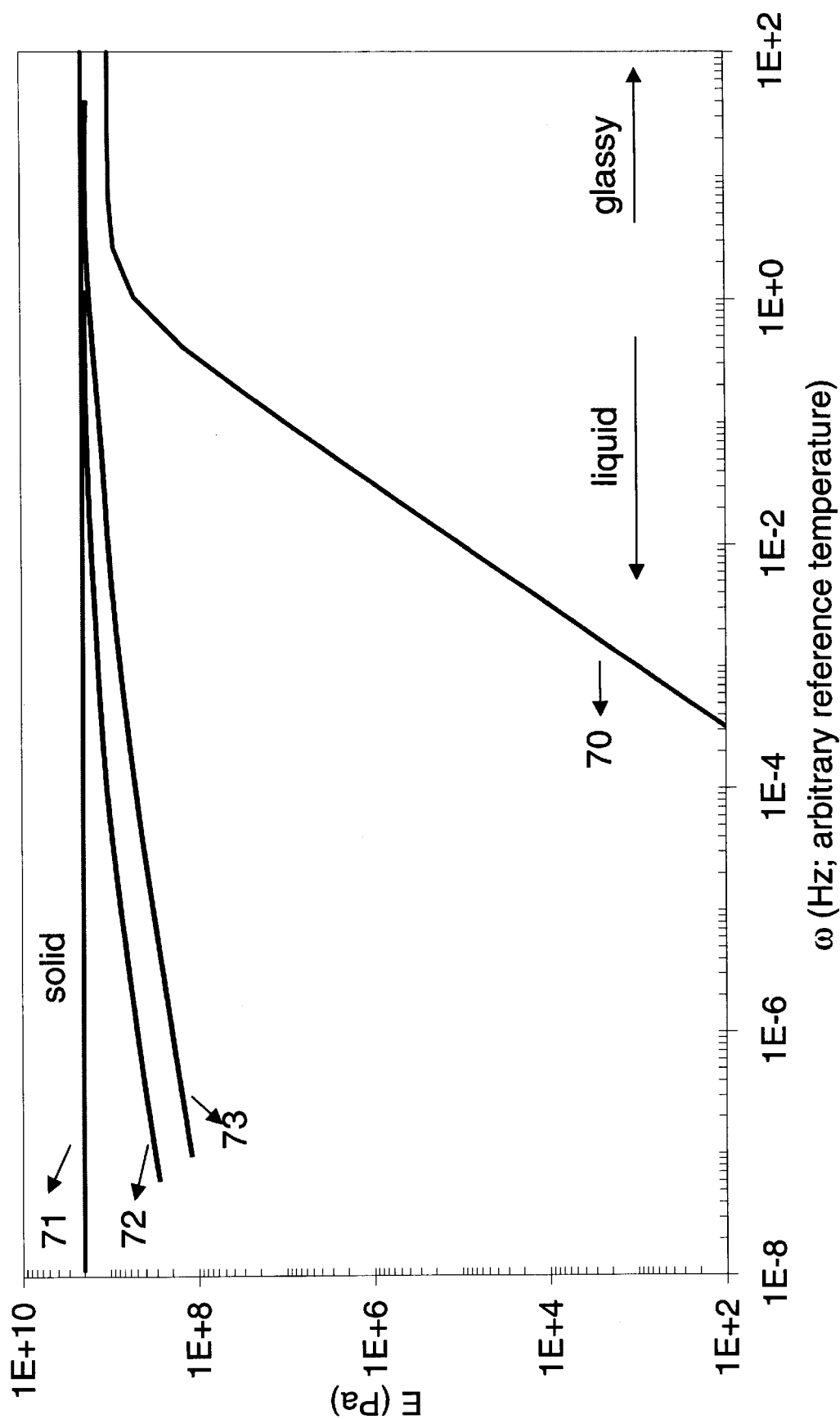
FIG. 2 is a log—log plot Young's modulus (E) versus frequency ($\omega$) for enthalpic materials.

As best shown in FIGS. 2–3, enthalpic materials such as crystalline silicon exhibit variable Young's modulus, hence non-linear behavior, for even the smallest deformations. FIG. 2 summarizes the frequency dependent elastic modulus for crystalline solids and non-crystalline glasses and liquids. For non-crystalline materials 70, the modulus is ca. 1 GPa or higher above the dynamic glass transition, and decreases rapidly as the frequency decreases below the dynamic glass transition. Crystalline solids 71 do not display a dynamic glass transition, and the modulus is relatively independent of frequency for small strain levels. However, as the strain levels increase 72, 73, the modulus decreases with decreasing frequency. This behavior is generic to all enthalpic materials, and can be understood with a simplistic atomic model for the macroscopic modulus, as shown in FIG. 3.

Figure 3A:
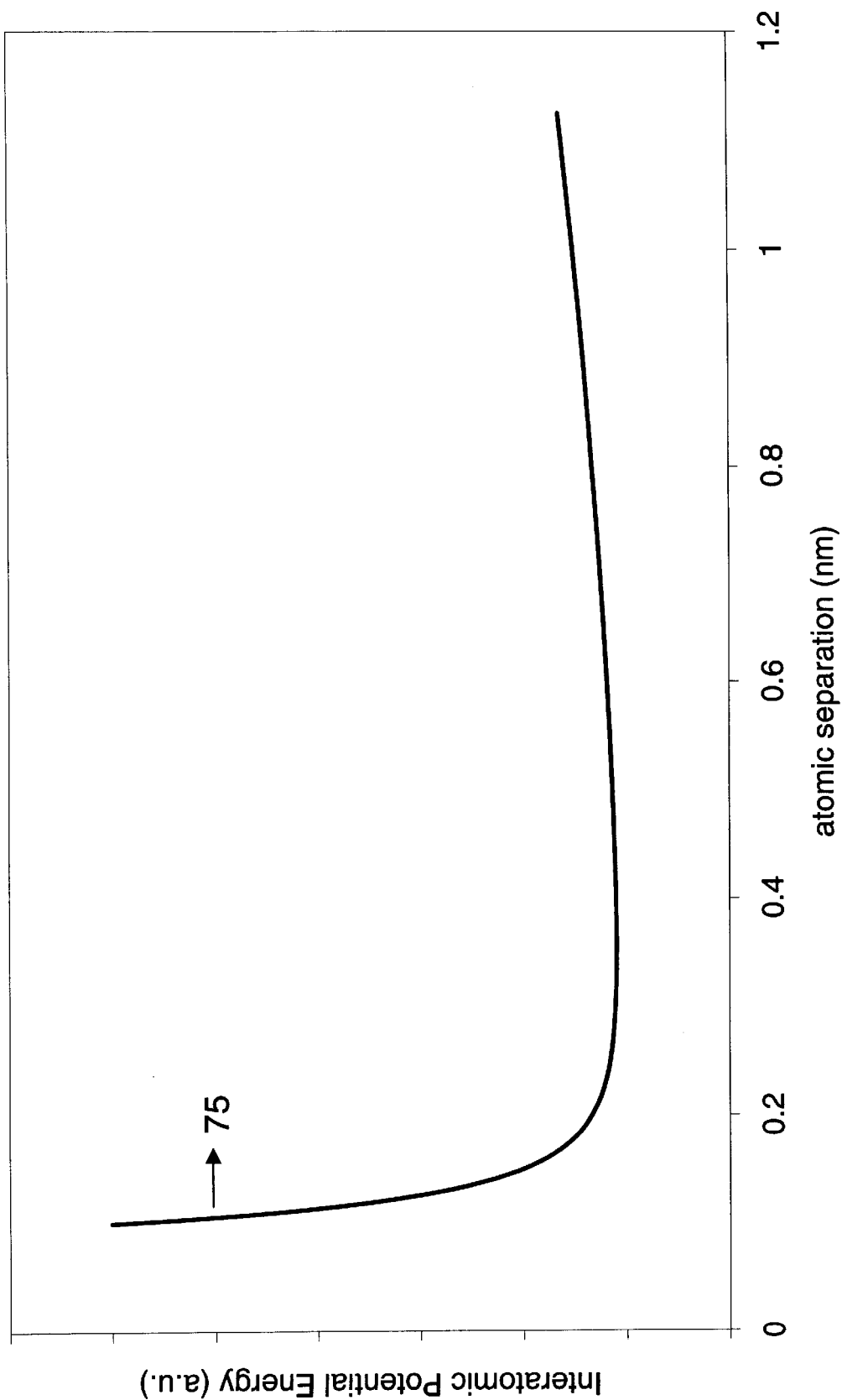
FIGS. 3a–3b are, respectively, plots of a representative interatomic potential for a two-atom system and the force-displacement curve felt by individual atoms.
Figure 3B:
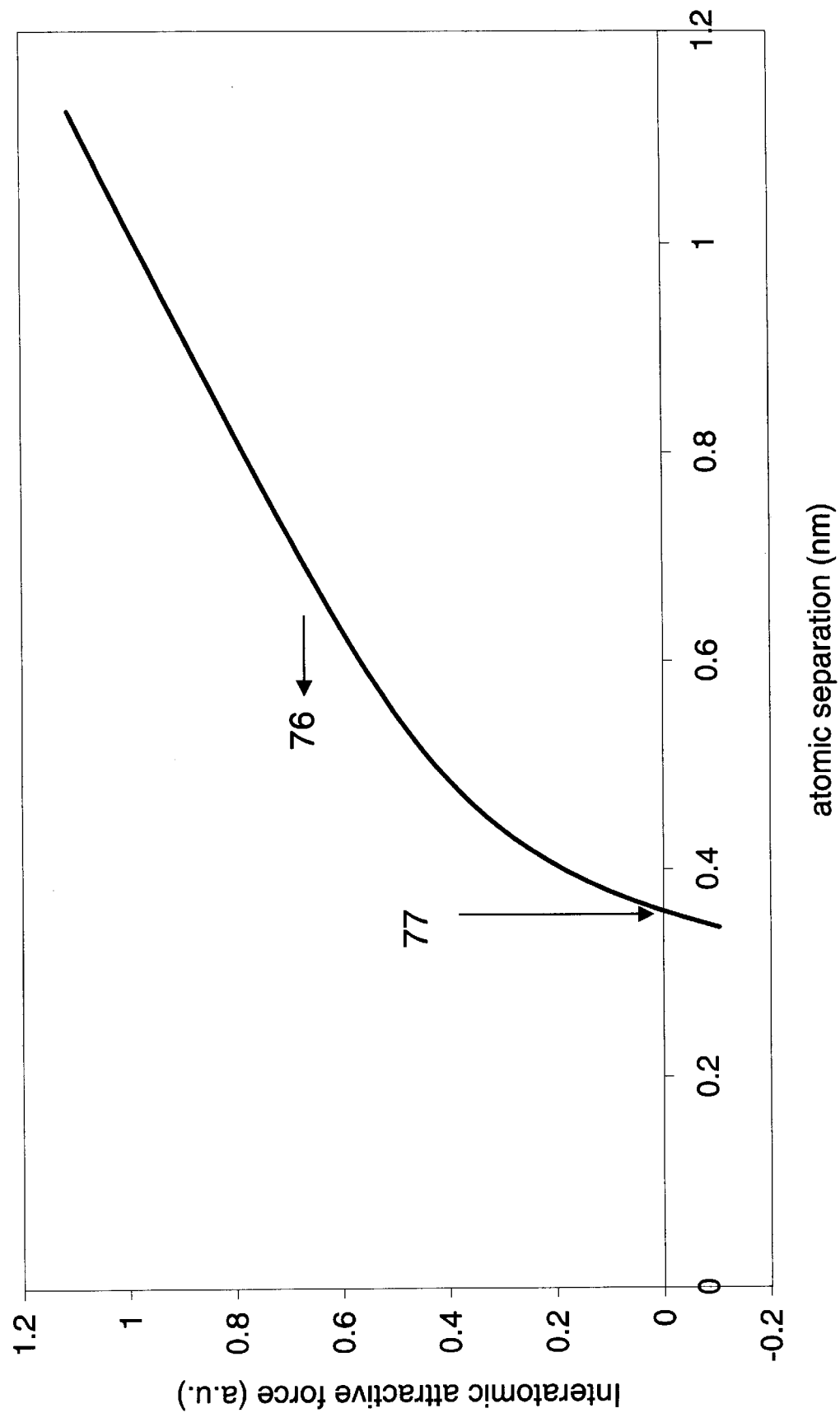

As shown in FIG. 3a, the interatomic potential 75 describes the potential energy of a two-atom system as a function of the distance between the two atoms. The two body interatomic potential can be used to illustrate the enthalpic modulus of crystalline and glassy materials. In the absence of external strain, the atoms rest in energy minimum positions; when an external strain is applied, the potential energy of the atom climbs up the interatomic potential. The force 76 felt by the atom is the slope of the interatomic potential, and is depicted in FIG. 3b. The atomic rest position 77 corresponds to the separation where the force is zero; as the atoms are pulled apart, the force increases, corresponding to the slope of the interatomic potential. Since the interatomic potential is non-linear with atomic separation, the force becomes a function of atomic separation. The macroscopic enthalpic material comprises many such two-atom and many-atom subsystems, but the initial slope of all such subsystems is about the same, and corresponds to an overall modulus of ca. 1 GPa or more. Thus, with respect to Equation 2, the $g_i$ for all modes is ca. 1 GPa or more, and the overall modulus appears to be independent of deformation frequency.

While this simple model simplifies the molecular origin of mechanical behavior in enthalpic materials, it does illustrate the inherent non-linearity. It can be seen from FIG. 3b that the force felt by the atom is non-linear with the displacement of the atom from its rest position. The macroscopic modulus arises from many such two-body and many-body interatomic potentials, with the same generic features depicted in FIG. 3a. Thus, non-linearities in the force-displacement curves of individual atoms translate into non-linearities in the stress strain curve at macroscopic dimensions. Since the modulus is the slope of the stress-strain curve, the overall modulus becomes a function of strain levels. Further, the different two-atom and many-atom potentials are differently affected~the initial modulus of the different modes are now different. Thus, the macroscopic modulus also becomes frequency dependent.

In contrast to enthalpic materials, the energy cost for deformation in entropic materials does not originate in changes in the interatomic distances, but in available atomic configurations. The overall modulus of entropic materials can also be frequency independent (as discussed below), but at much lower values.

Figure 4:
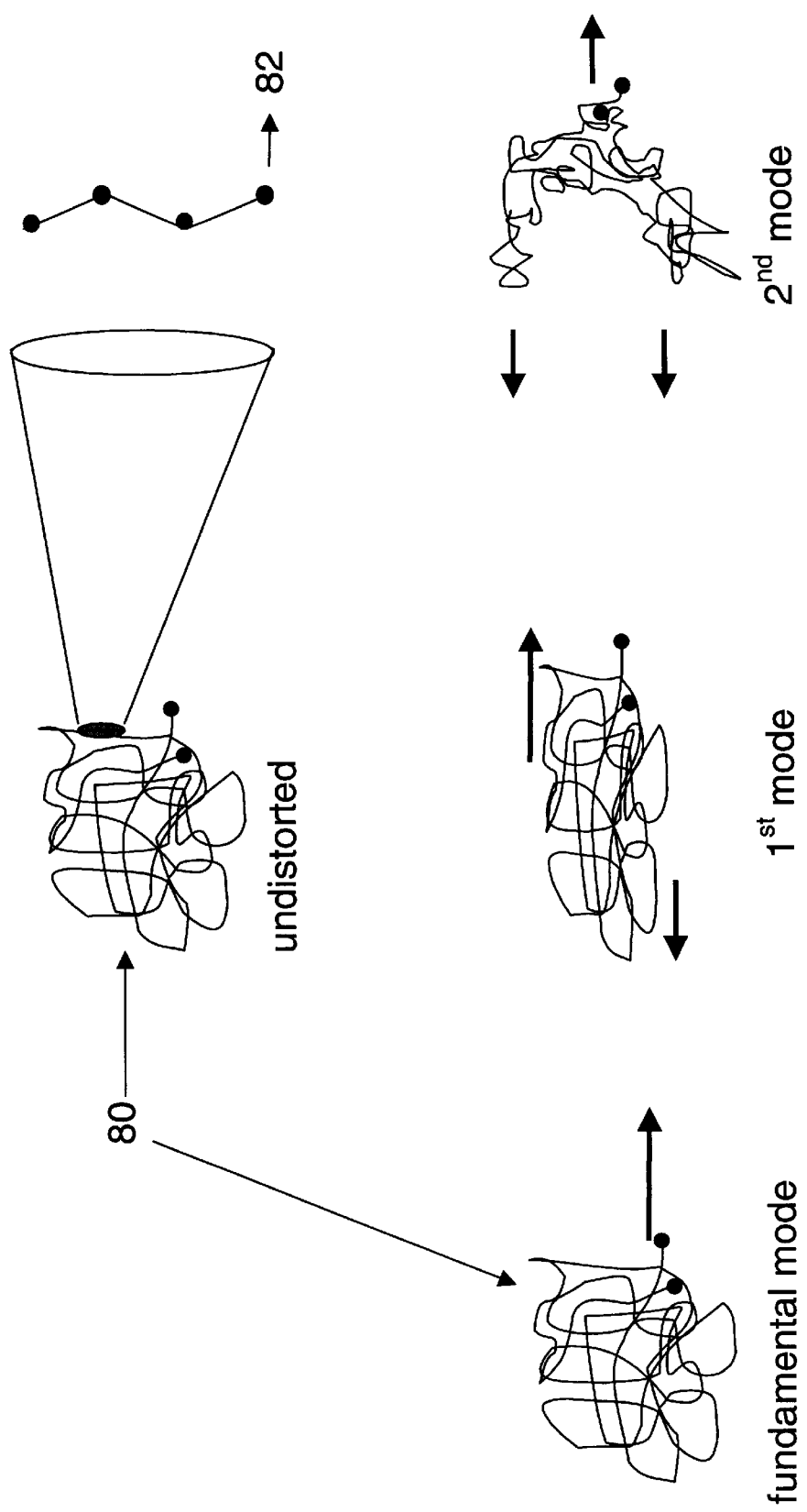
FIG. 4 is an illustration of a long chain entropic material and three deformation modes.

The entropic energy cost for deformation arises from the long chain nature of the material. FIG. 4 depicts a long polymeric strand 80 in which several atoms 82 along the backbone are covalently linked together. Under normal conditions (i.e. in the undistorted melt or dilute solution state), the mean square end-to-end distance of the strand is given by $$\langle r^2 \rangle = C_\infty n l^2 \left( \frac{1 + \cos\theta}{1 - \cos\theta} \right) \left( \frac{1 + \langle \cos\phi \rangle}{1 - \langle \cos\phi \rangle} \right) \qquad \text{eqn. 2}$$

In Equation 2, n is the number of backbone bonds in the chain, l is the length of one backbone bond, θ is the bond angle; and $C_\infty$ and Φ are two other factors. Equation 3 reduces to $\langle r^2 \rangle \approx 7nl^2$ for most flexible polymer systems. If n is large (ca. 100 or more), then the root mean square end-to-end distance (ca. $(\sqrt{7n})l$) is small compared to the chain contour length (nl).

Thus, entropic materials are best described by random coils of long chains comprising several hundred backbone bonds. If the two ends are fixed, then the random coil can adopt several configurations within the two constrained end points. During deformation, the root mean square end-to-end distance is increased, but remains small compared to the chain contour length. Within this altered state, the chain can still adopt several possible configurations, but the number of available configurations decreases from the unaltered state. This decrease in the number of available configurations results in an increase in the entropic energy of the system~this is the source of the energy cost of deformation for entropic materials. If n is large, then the root mean square end-to-end distance remains negligible compared to the contour length of the chain. Thus, the deformation process remains linear (stress is linear with strain) for large strain limits (ca. 100% or more)~it is only when the r.m.s. end-to-end distance becomes comparable to the contour length that the deformation process becomes non-linear. Further, since this entropic cost for deformation is small compared to the energy cost of bond deformation, the modulus of entropic materials is several orders of magnitude lower than that of enthalpic materials (ca. less than 1 MPa compared to greater than 1 GPa).

The deformation process comprises several modes, the first few are depicted in FIG. 4. As can be seen from the Figure, the different deformation modes resemble the vibration modes of a string, with the higher order modes corresponding to deformation at shorter length scales. Typically, the relaxation time of a mode increases with increasing mode length scale, and if the length scale of a mode is greater than ca. 100 backbone bonds, then the mode conforms to entropic elasticity (i.e. the enthalpic energy cost of deformation within that mode is negligible). Thus, if the chain is large enough (typically, at least 100 and preferably 200 or more backbone bonds), then the first few modes conform to entropic elasticity. Under these conditions, the modulus is dominated by the initial modulus of the first few modes, and becomes independent of dynamic frequency or time of actuation. Finally, the long chain polymer can be further reacted into different topologies (e.g. a crosslinked network as in an elastomer, which can be further modified into an aerogel by incorporating air bubbles).

Figure 5:
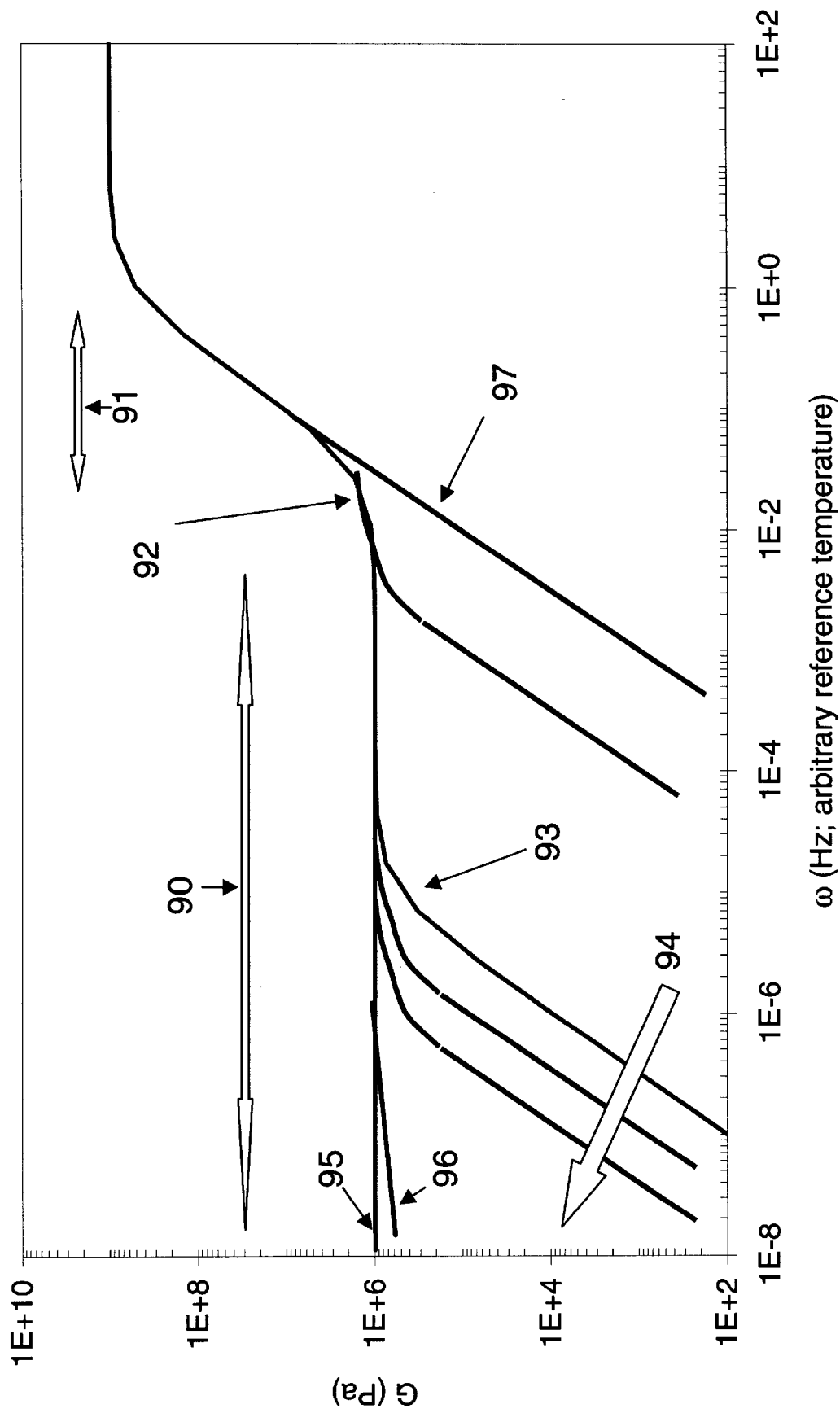
FIG. 5 is a log—log plot of modulus (G) versus frequency (ω) for non-crystalline materials with various chain lengths.

Thus, ignoring viscous flow, entropic materials such as elastomers, aerogels or long chained polymers exhibit a broad entropic plateau region (90) below the dynamic glass transition 91 as shown in FIG. 5. The dynamic glass transition moves to higher frequencies as the temperature is raised. The entropic plateau region 90 extends over several frequency decades and an extremely wide range of deformation in which the Young's modulus is essentially constant. The essential device requirement is that the upper corner frequency 92 is at least one order of magnitude larger than the device actuation rate, and the lower corner frequency 93 be at least one order of magnitude smaller than the device recalibration frequency. The upper corner frequency of the plateau region is the lower edge of the dynamic glass transition. Thus, it is affected by motions at local length scales (cooperative motions of ca. 20 or less backbone bonds), and is determined by local structure of the entropic material, not its overall length or topology. For polymers, the width of this plateau region increases with polymer chain length (since the length scale of the fundamental mode corresponds to the polymer chain length). The roll off in polymers is shifted to lower frequencies as the chain length increases (94). Elastomeric materials remain flat and never roll-off (95) because the effective length scale (and the relaxation time) of the fundamental mode is infinite. Aerogels (96) will roll-off at very low frequencies corresponding to the length scale of the entrapped air bubbles.

Volume Deformation & Viscous Flow in Compliant Elastomers

Entropic materials are incompressible, with a near infinite bulk modulus. This comes about because the Poisson's ratio (v) is ca. 0.5. The Bulk modulus K, and the elastic modulus (E) are related by $K = E/(1-2v)$.

Thus, in entropic materials, the Bulk modulus is nearly infinite, even though the Elastic modulus is ca. 0.1 to 1 MPa. This compares to the situation in solids and glasses wherein the Poisson's ratio is ca. 0.33, and the bulk modulus K is ca.

3 times greater than the elastic modulus. From a molecular viewpoint, the infinite bulk modulus implies a near infinite energy cost for isothermal volume changes in the entropic material. This compares with solids and glasses wherein the energy cost for volume and linear deformations are comparable.

Thus, a flow process that transports material in and out of the volume element must accompany volume deformation in entropic materials. In perfect elastomers, the viscosity associated with this flow process is nearly infinite. This creates complications in the deformation process if the compliant member is designed incorrectly. Consider the deformation of an elastomer layer sandwiched between two hard surfaces. The same scaling behavior applies to tensile deformation as well. Since the volume of the elastomer layer cannot change, a flow process must accompany the deformation process.

The force required for flow is given by $$\eta \frac{V}{d} L^2$$

Where $\eta$ is the viscosity associated with the flow process, V is a characteristic velocity associated with the flow, d is the thickness of the elastomer layer, and L is the lateral dimension.

To a first approximation, this force is associated with a pressure gradient between the center and the edges of the elastomer layer. Thus $$\eta \frac{V}{d} L^2 \approx [P_{max} - P_o] L \cdot d$$

Hence, the characteristic velocity associated with flow is given by $$\overline{V} \approx \frac{[P_{max} - P_o] \cdot d^2}{\eta \cdot L}$$

And the response time, which is the time required to displace a desired volume, becomes $$\tau_R = \frac{\Delta V}{\overline{V} L d} = \frac{\Delta d L^2}{\overline{V} L d} \approx \frac{\Delta d L^2}{\frac{[P_{max} - P_o] d^2}{\eta L} L d} \quad \text{eqn. 3}$$

$$\tau_R \approx \frac{\Delta d \eta L^2}{[P_{max} - P_o] d^3}$$

Equation 3 is an approximation that only serves to illustrate the general scaling behavior. With this approximation, it can be seen that the response time varies with the viscosity, the square of the elastomer lateral dimension, and the inverse of the 3$^{rd}$ power of the elastomer thickness. Typically, perfect elastomers are associated with an infinite viscosity ($\eta = \infty$). Thus, the response time will always be infinite for a perfect elastomeric network. However, the viscosity in real elastomers is a finite number, because the degree of crosslinking is always less than 100% (>90% often being considered "fully crosslinked"). Incorporating network defects and/or small dopant molecules within the elastomer and/or modifying the network itself to facilitate flow can further lower the viscosity. The network can be modified by, for instance, swelling the elastomer network with dopant molecules (e.g. toluene will swell a silicone based elastomer). This lowering of the viscosity enables devices in which the entropic compliant member is compressed for the moveable optical element motion.

From a molecular viewpoint, the viscosity is associated with center of mass motions (i.e. the fundamental mode depicted in FIG. 4) of small(er) unreacted polymer strands in the elastomer and other dopant molecules of finite molecular weight. These smaller molecules flow in the matrix of the elastomer network (strands of the network cannot undergo center of mass motion). Considering the small dopant molecules separately, their center of mass motion is characterized by the corresponding modulus falling rapidly below 1 MPa as shown in FIG. 5. The characteristic frequency of center of mass motion decreases as the chain length increases. This frequency (97) can be very high if the chain length is very small. This time constant follows from the inherent viscosity of the dopant molecules, and the size of the molecular channels through which they must flow. Under these conditions, both the tensile and the compressive devices become viable.

However, the flow process remains a dissipative energy loss mechanism~the energy required for flow is lost from the system, and must be minimized in comparison to the energy associated with elastomer deformation. If the total energy associated with device operation is dominated by the dissipative term, then the device response becomes time dependent (i.e. the device response becomes dependent on its loading history), and the dissipated energy also serves to reduce the device lifetime.

This issue of the incompressibility of the compliant member is best addressed by designing the device such that the tuning operation does not require any volume change in the entropic compliant member. For instance, if the motion of the moveable optical element requires shear deformation of the entropic compliant member, then there is no volume change requirement on the compliant member. In a diaphragm type device, optical element motion requires a tensile/compressive loading on the compliant member. Under these conditions, the net volume change is small, and the length scale over which the volume must change (across the thin diaphragm layer) is also small~viscous flow effects become negligible for these devices as well. In these cases, the material's response time is determined by the elastic plateau behavior of the entropic compliant member only.

Positional and Angular Stability

Figure 6:
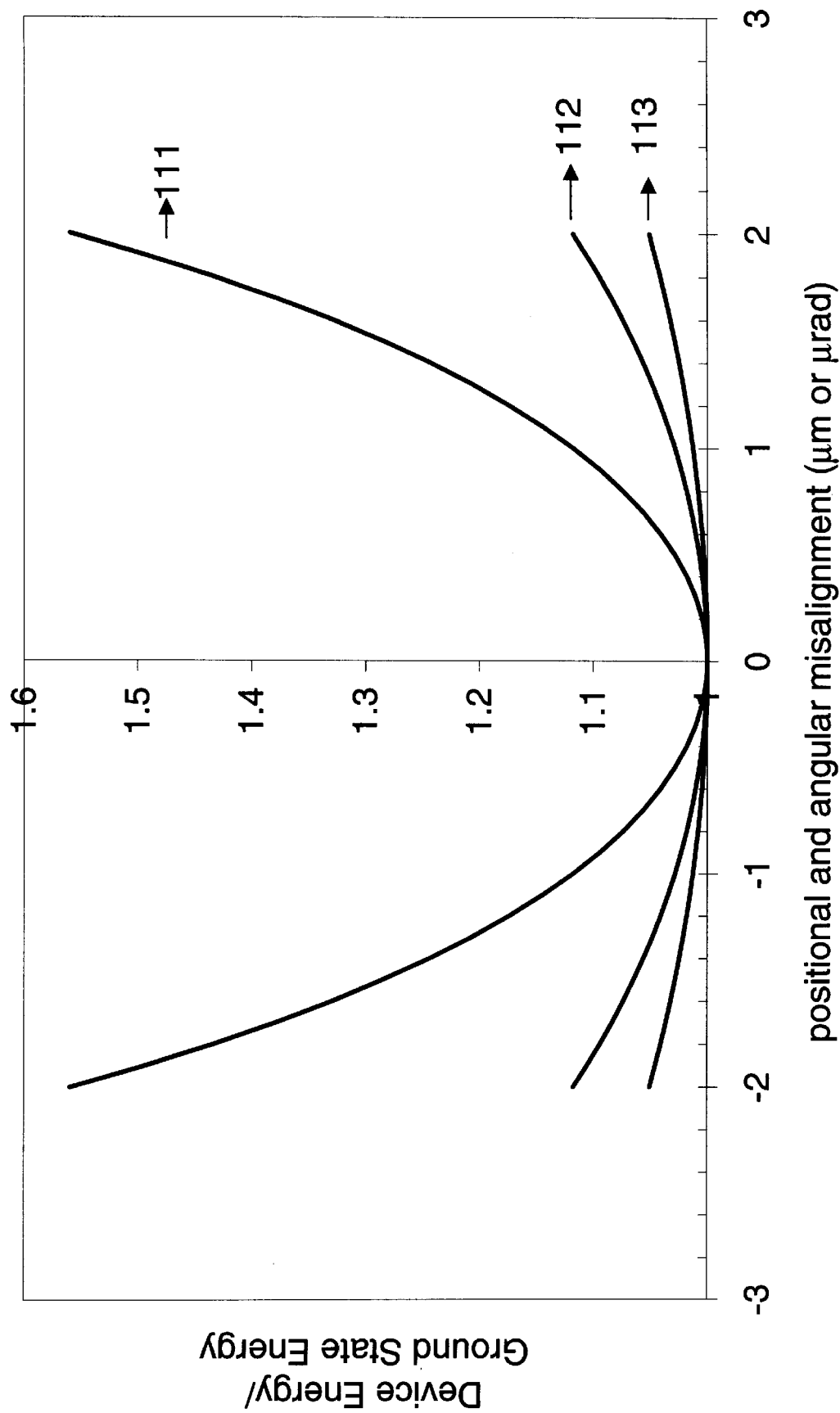
FIG. 6 is an energy profile of a device illustrating the increase in device energy for positional and angular misalignment.

As discussed, the compliant member, hence the movable optical element, must both be positionally and angularly stable to provide repeatable performance. This is best illustrated by the energy profiles depicted in FIG. 6. A stable device results when the potential energy of the device increases sharply with any deviation from the desired angle and position: devices in which this potential energy increase is minimal will be unstable. The potential energy content of the device is approximately proportional to kT (k is the Boltzmann's constant, and T is the absolute temperature). Further, the device possesses entropic energy approximately proportional to the width of the configuration space explored by it. Thus, the angle and position of the moveable optical element will explore the configuration space wherein the increase in device energy is proportional to its energy content (kT and entropic energy). The corresponding misalignment and positional inaccuracy must be within the specifications discussed previously. Thus, the steeper energy profile 111 is preferred over the shallower energy profiles 112 and 113.

Figure 7B:
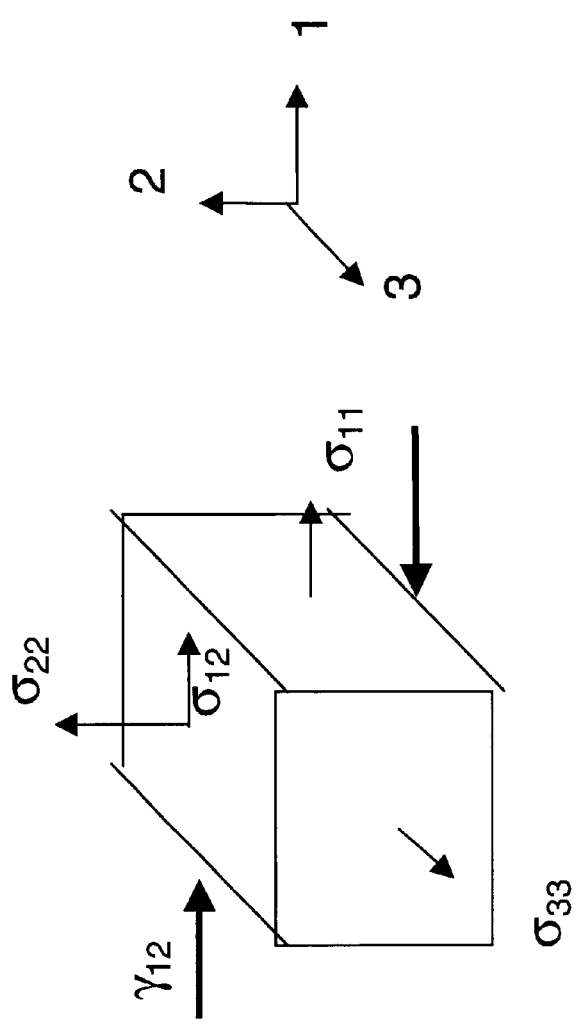
FIGS. 7a–7b are, respectively, illustrations of the increase in the restoring normal stress if a shear type device is subject to angular misalignment and the normal stress ($\sigma_{nn}$) acting on a unit volume element of an entropic material subjected to shear deformation ($\gamma_{12}$)
Figure 7A:
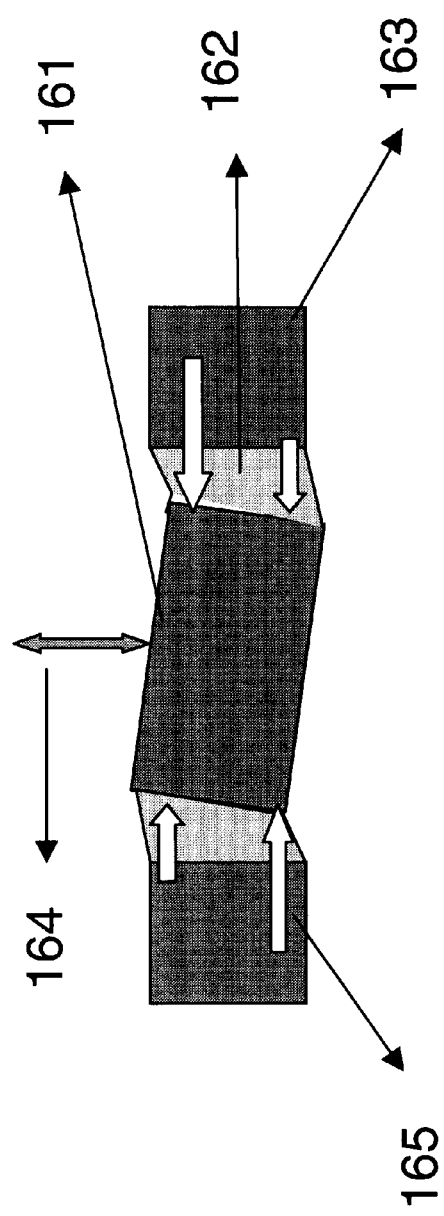

Entropic materials can afford better angular stability as best illustrated by considering a shear type device illustrated in FIG. 7a wherein the moveable optical element moves against a shear stress exerted by the compliant member. Deviations from the desired angular position are accompanied by an energy cost of distorting the compliant member~this energy cost includes the energy for volume deformation in the compliant member 162. For enthalpic compliant members, the energy cost for shear and bulk deformations are comparable: thus, the energy costs for angular misalignment and optical element motion are comparable. For entropic compliant member, the bulk modulus is several orders of magnitude greater than the shear modulus: thus the energy cost for misalignment is much greater (at least an order of magnitude) than the energy cost for the desired motion of the optical element. Thus, with the right design of the compliant member (i.e. when the energy cost of optical element motion is not associated with a volume change, but angular misalignment is associated with a volume change), entropic materials afford more angular stability than enthalpic materials. Conversely, if the compliant member is designed incorrectly (i.e. when the energy cost of optical element motion includes the energy cost for volume deformation), then the incompressibility of the entropic layer becomes a significant disadvantage.

Taking advantage of entropic materials' normal stress behavior can further enhance stability. To achieve this benefit, the compliant member must be configured such that the entropic material undergoes shear deformation. As shown in FIG. 7b, when a unit volume of such a material is subjected to shear deformation ($\gamma_{12}$), it displays normal stresses ($\sigma_{11}$, $\sigma_{22}$, and $\sigma_{33}$) acting perpendicular to the three orthogonal unit planes. These normal stresses are in addition to the shear stress ($\sigma_{12}$) displayed by all materials, and are a consequence of the long chain nature of the entropic material (i.e. the causality of the normal stress behavior is identical to the causality of the entropic elastic behavior). Further, the magnitude of the normal stress is proportional to the square of the shear strain, which compares to the shear stress being directly proportional to the shear strain. This feature can be used to further enhance device stability, as explained below.

Consider a tunable optical component wherein the moveable optical element 161 is supported by a shear type entropic compliant member 162 to a rigid frame 163. If the optical element is misaligned, then one side of the shear sandwich must undergo compressive volume deformation and the other side must undergo tensile volume deformation~this process has a very high energy penalty as discussed previously. In addition, the shear strain of the compliant member during motion is given by the vertical motion 164 of the optical element divided by the compliant member thickness: thinner sides of the compliant member are subjected to greater shear strains than thicker sides). Thus, the normal stress 165 acting on the optical element from the thinner side is greater than the normal stress acting on it from the thicker side ~this force imbalance creates a restoring torque on the optical element that opposes misalignment while it is being displaced. Finally, since the magnitude of the normal stress increases with the square of the shear strain rate, the magnitude of the restoring torque increases rapidly, as the optical element is misaligned.

Tunable Optical Components

The use of entropic materials also greatly enhances the design space available for configuring tunable optical components and, more specifically, the compliant member. As shown in FIGS. 8a–8d, the compliant member can be configured to undergo compressive, tensile, tensile/compressive, or shear deformation.

As shown in FIG. 8a, an optical element 121 and a counter electrode 122 are separated by an entropic material 123 such as an elastomer. The application of a command signal creates field lines that apply an electrostatic force to move the optical element towards the counter electrode and squeeze the materials. As mentioned previously, the incorporation of defects in the elastomer network and/or small dopant molecules can significantly lower the viscosity. In addition, the entropic network itself can be modified (e.g. by swelling the network) to facilitate the flow of the dopant molecules. As a result, the device response time can be reduced to a point where scanning operation is possible. Another option is to use aerogels, which are characterized by very small air bubbles in the material. These bubbles are compressible, which minimizes the viscous flow requirement and reduces the device time constant.

As shown in FIG. 8b, the flow problem can also be overcome by moving the counter electrode and operating in a tensile mode (the electrostatic force pulls downward on the optical element thereby stretching the entropic material). More specifically, a thick entropic compliant member 131 is formed on the rigid support 132 to hold the optical element 133. A counter electrode 134 is positioned opposite and parallel to optical element 133.

The compliant member for the optical element can be arranged in a diaphragm type layer undergoing tensile/compressive deformation (FIG. 8c) or in a shear sandwich between two rigid plates undergoing shear deformation (FIG. 8d). These deformation modes involve either no or negligible volume change, hence do not require a net flow process. Therefore, the time constants for these deformation processes are very fast.

As shown in FIGS. 8c and 8d, shear vs. diaphragm devices are differentiated only in the aspect ratio (i.e. the ratio of the height and lateral width) of the elastomer. When the elastomer layer resembles a sheet of paper (e.g. an aspect ratio less than 0.1), undergoing deformation along the plane normal, then tensile/compressive forces accompany the deformation and the device is said to be in diaphragm mode. More specifically, as shown in FIG. 8c entropic diaphragm 141 is mounted on member 142 to hold optical element 143 in a parallel relation to a counter electrode 144.

When the elastomer layer has an aspect ratio greater than 1, the device is said to be in shear mode (For aspect ratios between 1 and 10, the shear equations fully describe the overall deformation process, but edge effects also contribute to overall device performance; for aspect ratios between 0.1 and 1, both the shear and the tensile/compressive forces affect the overall energy cost for deformation). More specifically, as shown in FIG. 8d the optical element 153 is supported by an entropic sleeve 151 mounted on a rigid support 152 in parallel relation to a counter electrode 154. Both these modes afford good elastic processes. The shear device also affords the additional stabilizing mechanisms described above.

Figure 9:
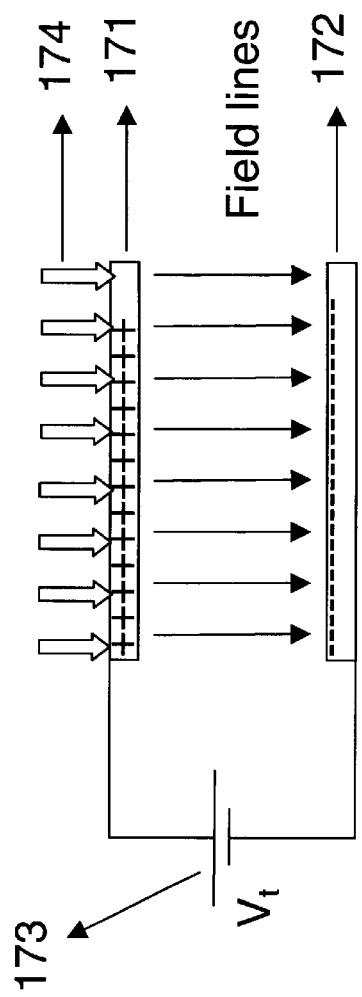
FIG. 9 illustrates an electrostatic actuation mechanism for use with any of the device geometries.

In each case, an actuating force must be applied to the compliant member to cause the device's optical element to move. As shown in FIG. 9, an electrostatic actuator is created by depositing two electrodes 171,172 one on or near the optical element (e.g. a 50 nm thick silver layer) and connecting them to a controllable voltage source 173. The command signal ($V_c$) is applied between the two electrodes, resulting in field lines that produce an attractive stress 174 between them. Multiple different configurations are contemplated to actuate the optical element. For example, optically transparent electrodes could extend across the optical element through the optical path. This may provide more freedom in the engineering space to separately optimize the optical element and actuation mechanism.

Figure 10:
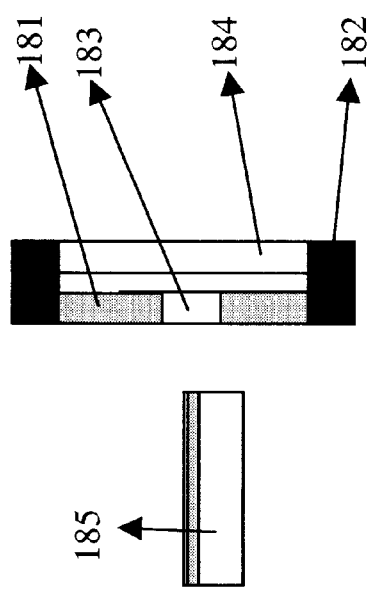
FIG. 10 illustrates a laser source, with a tunable etalon cavity.

The various configurations for the compliant member (tension, compression, tension/compression, shear) can be combined with different electrostatic-actuation designs to form a variety of tunable optical components. For example, if the counter electrode is also a partially reflecting mirror the devices shown in FIG. 8 functions as a tunable Fabry-Perot Interferometer. As is shown in FIG. 10, the compliant mechanisms illustrated in FIG. 8 can also be used to make a tunable laser source. A laser source 185 injects light onto a tunable etalon cavity comprising a fixed mirror 184 and a tunable mirror 183. The tunable mirror is supported by an entropic member 181 to a rigid frame 182.

Other tunable devices such as (chromatic) dispersion compensators and add/drop multiplexers and be made with minor variations of the compliant mechanisms illustrated in FIG. 8.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A tunable optical component, comprising:
   a counter electrode;
   a movable optical element;
   a compliant member that supports the movable optical element, said compliant member being formed of a material that exhibits an entropic plateau region; and
   an electrostatic actuator for applying an electrostatic force that deforms the compliant member and moves the optical element as a function of an electric command signal.

2. The tunable optical component of claim 1, wherein the material comprises long chain polymers with at least 100 bonds per chain that are fully crosslinked at least 90% of the bonds.

3. The tunable optical component of claim 2, wherein the material is selected from one of an elastomer, aerogel or long chain polymer.

4. The tunable optical component of claim 1, wherein the material exhibits a Young's modulus less than 5 MPa in the entropic plateau region.

5. The tunable optical component of claim 1, wherein said optical element moves at a scan rate, the entropic plateau region extending over multiple frequency decade with an upper corner frequency at least one order of magnitude greater than the scan rate.

6. The tunable optical component of claim 1, wherein said movement deforms the compliant member over a deformation range, the material, hence the compliant member exhibits a linear elastic behavior over the entire deformation range.

7. The tunable optical component of claim 1, wherein the material is incompressible and the compliant member undergoes no volume change during deformation, said material exhibiting an energy cost of misalignment of the movable optical element that is at least an order of magnitude greater than the energy cost of deformation thereby self-stabilizing the optical element.

8. The tunable optical component of claim 1, wherein the material undergoes sheer deformation, said material exhibiting a normal stress that provides a force on the optical element perpendicular to the direction of motion thereby further self-stabilizing the optical element.

9. The tunable optical component of claim 1, wherein said movement scans the optical element with a time constant $t_{scan}$, said material undergoes a volume change during deformation that causes a viscous flow with a time constant $t_{response}$ that is at least one order of magnitude less than $t_{scan}$.

10. The tunable optical component of claim 9, wherein the material undergoes compressive stress during deformation, said material being doped with small molecules to reduce its viscosity such that $t_{response}$ is at least one order of magnitude less than $t_{scan}$.

11. The tunable optical component of claim 9, wherein the material lies undergoes compressive stress during deformation, said material network is modified to reduce its viscosity such that $t_{response}$ is at least one order of magnitude less than $t_{scan}$.

12. The tunable optical component of claim 9, wherein the material undergoes tensile stress during deformation, said material having a thickness such that tresponse is at least one order of magnitude less than tscan.

13. The tunable optical component of claim 1, wherein the compliant member and the material lie outside an optical path.

14. The tunable optical component of claim 1, wherein the compliant member forms a diaphragm that supports said movable optical element and undergoes tensile/compressive deformation response to said movement.

15. The tunable optical component of claim 14, wherein the diaphragm has an aspect ratio less than 1.

16. The tunable optical component of claim 1, wherein the compliant member forms a sleeve that supports the movable optical element and undergoes sheer deformation in response to the variable dimensioning.

17. The tunable optical component of claim 16, wherein the sleeve has an aspect ratio greater than 1.

18. The tunable optical component of claim 16, wherein the material undergoes no volume change during sheer deformation such that the energy cost of misalignment of the movable optical element is at least an order of magnitude greater than the energy cost of deformation thereby self-stabilizing the movable optical element.

19. The tunable optical component of claim 16, wherein the material exhibits a normal stress that provides a force on the movable optical element perpendicular to the direction of motion thereby further self-stabilizing the movable optical element.

* * * * *